US005560805A

United States Patent [19]

Hamilton et al.

[11] Patent Number: 5,560,805

[45] Date of Patent: Oct. 1, 1996

[54] ENHANCED DECOLORIZATION OF WASTE PAPER WITH SELECTED AMINES

[75] Inventors: Glynn A. Hamilton, Charlotte; Paul W. Shepperd, III, Mooresville, both of N.C.

[73] Assignee: Hoechst Celanese Corporation, Somerville, N.J.

[21] Appl. No.: 97,745

[22] Filed: Jul. 27, 1993

[51] Int. Cl.$^6$ ........ D21C 5/02

[52] U.S. Cl. ........ 162/5; 162/6; 162/7; 162/72; 162/78; 162/82; 162/83

[58] Field of Search ........ 162/5, 70, 166, 162/6, 76, 83, 78, 82, 7, 72

[56] References Cited

U.S. PATENT DOCUMENTS

| | | | |
|---|---|---|---|
| 1,572,478 | 2/1926 | Hammond . | |
| 1,923,178 | 8/1933 | Ulrich et al. | 260/127 |
| 2,003,928 | 6/1935 | Evans et al. | 8/2 |
| 2,019,124 | 10/1935 | Evans et al. | 8/2 |
| 2,164,930 | 7/1939 | Lubs | 8/34 |
| 2,218,479 | 10/1940 | Peterson et al. | 92/9 |
| 2,248,128 | 7/1941 | Seymour et al. | 8/64 |
| 2,525,770 | 10/1950 | Cook et al. | 8/102 |
| 2,587,597 | 3/1952 | Cook et al. | 8/102 |
| 2,860,944 | 11/1958 | Young | 8/104 |
| 2,902,453 | 9/1959 | Matlin | 252/105 |
| 2,985,500 | 5/1961 | Janson et al. | 8/102 |
| 2,986,488 | 5/1961 | Weisgerber et al. | 162/158 |
| 3,074,774 | 1/1963 | Sapers et al. | 8/69 |
| 3,361,794 | 1/1968 | Wakeman et al. | 260/501.15 |
| 3,554,863 | 1/1971 | Hervey et al. | 162/158 |
| 3,591,325 | 7/1971 | Sapers | 8/102 |
| 3,617,439 | 11/1971 | Chapman | 162/158 |
| 3,666,409 | 5/1972 | Yoshikawa et al. | 23/116 |
| 3,960,649 | 6/1976 | Sullivan | 162/72 |
| 4,013,505 | 3/1977 | Balcar et al. | 162/5 |
| 4,043,908 | 8/1977 | Roberts et al. | 162/5 |
| 4,144,122 | 3/1979 | Emanuelsson et al. | 162/158 |
| 4,441,962 | 4/1984 | Osborn | 162/111 |
| 4,557,801 | 12/1985 | Avis | 162/157.6 |
| 4,618,400 | 10/1986 | Wood et al. | 162/5 |
| 4,632,730 | 12/1986 | Ulubay et al. | 162/111 |
| 4,666,558 | 5/1987 | Wood et al. | 162/5 |
| 4,710,267 | 12/1987 | Elsby et al. | 162/5 |
| 4,741,842 | 5/1988 | Adams | 252/548 |
| 5,013,404 | 5/1991 | Christiansen et al. | 162/72 |
| 5,100,574 | 3/1992 | Urushibata et al. | 162/5 |
| 5,129,987 | 7/1992 | Joachimides et al. | 162/25 |
| 5,200,034 | 4/1993 | Richmann et al. | 162/5 |
| 5,211,809 | 5/1993 | Naddeo et al. | 162/6 |
| 5,213,661 | 5/1993 | Naddeo et al. | 162/8 |
| 5,227,019 | 7/1993 | Bouchardt | 162/5 |
| 5,248,388 | 9/1993 | Richmann et al. | 162/5 |
| 5,338,401 | 8/1994 | Naddeo et al. | 162/6 |

FOREIGN PATENT DOCUMENTS 8225489 9/1976 Japan .

OTHER PUBLICATIONS

*Dyeing and Chemical Technology of Textile Fibers*, by E. R. Troutman (fifth edition, Charles Griffin and Co. Ltd., Great Britain, 1975).

C. R. Noller, *Textbook of Organic Chemistry* (W. B. Saunders Co., Philadelphia, Pennsylvania, 1966) at p. 224.

*Advanced Organic Chemistry*, J. March (third edition, John Wiley & Sons, New York, 1985) at pp. 364–368, 845.

TAPPI, Standard Method T205, om–88, "Forming handsheets for physical tests of pulp" 1988.

TAPPI, Standard Method T218 om–91, "Forming handsheets for reflectance testing of pulp (Büchner funnel procedure)" 1991.

TAPPI, Standard Method T494 om–88, "Tensile breaking properties of paper and paperboard (using constant rate of elongation apparatus)" 1988.

TAPPI, Standard Method T525 om–86, "Diffuse brightness of pulp (d/0°)", 1986.

*Primary Examiner*—Peter Chin
*Attorney, Agent, or Firm*—Rosemary M. Miano

[57] ABSTRACT

A method for bleaching pulp containing pulp from color dyed waste paper, wherein the method comprises bleaching the pulp with a bleaching chemical, especially sodium hydrosulfite, in the presence of a selected ethoxylated amine.

12 Claims, No Drawings

ENHANCED DECOLORIZATION OF WASTE PAPER WITH SELECTED AMINES

BACKGROUND OF THE INVENTION

This invention concerns enhanced color removal from colored waste paper, for example, post-consumer colored paper being recycled or colored broke being recycled from a papermaking machine. The method of the invention describes a process for brightening fiber from colored waste paper while increasing fiber web or paper web strength.

In current methods of processing colored waste paper for use in recycled paper products the waste paper is usually bleached prior to forming the new product so that the desired color and brightness can be obtained in the new product. There are a number of problems associated with the recycling of such colored waste paper. These include (1) the presence of residual color from dyes used to dye the paper and dyes used in certain types of printing, and (2) loss of strength of the fiber during processing. Typically, attempts at increasing the brightness have included the use of multiple-stage bleaching with hydrogen peroxide or chlorine-containing oxidative bleaches which adversely affect the pulp strength. In addition, the chlorine containing bleaches may contribute to the formation of chlorinated organics which are environmentally undesirable. Methods to recover the loss of strength have included adding expensive kraft fiber or bonding agents to the pulped material.

There have been a number of attempts at forming improved pulps.

U.S. Pat. No. 4,710,267 to Elsby et al discloses dye removal from recycled fiber using tertiary or quaternary ammonium compounds. These ammonium compounds have a carbonyloxy portion. Customary bleaching agents may be used in conjunction with these ammonium compounds.

Japanese patent application Number 82/25489 teaches color removal by washing the pulp with alkylamine-propoxylates-ethoxylates.

U.S. Pat. No. 2,003,928 to Evans et al describes enhanced bleaching of textiles containing azoic dyes with the use of sodium dithionite and a quaternary ammonium salt having not less than 10 carbons.

U.S. Pat. No. 5,013,404 to Christiansen et al describes the alkaline hydrogen peroxide bleaching of mechanical wood pulp with a quaternary amine compound with an hydroxy group such as (3-chloro-2-hydroxypropyltrimethyl)ammonium chloride.

U.S. Pat. No. 3,554,863 to Hervey et al teaches the use of cationic quaternary amine compounds as debonding agents for pulp sheets. The use of such compounds lowers the tensile strength of the sheets.

U.S. Pat. No. 3,617,439 to Chapman describes a method for improving comminution of pulp sheets from cellulosic fibers in order to make fibers from which air-laid absorbent products may be prepared. The method includes the use of a quaternary zwitterionic surfactant.

U.S. Pat. No. 4,144,122 to Emanuelsson et al describes the use of quaternary ammonium compounds to treat cellulose pulp and paper to reduce inter-fiber bonding and thereby obtain a low mechanical strength for the fibers.

U. S. Pat. No. 4,441,962 to Osborn discloses a process for making absorbent tissue paper webs using quaternary ammonium compounds as debonding agents to weaken the strength of the interfiber bonds.

U.S. Pat. No. 4,632,730 to Ulubay et al discloses a method for increasing the absorption rate of paper using selected ethoxylated and/or propoxylated compounds.

U.S. Pat. No. 5,129,987 to Joachimides et al discloses a method of bleaching mechanical wood pulp with sodium hydrosulfite in a refiner.

Enhanced bleaching of textiles containing dyes is described in *Dyeing and Chemical Technology of Textile Fibers,* by E. R. Troutman (fifth edition, Charles Griffin and Co., Ltd., 1975).

There still remains a need for a method of decolorizing colored waste paper which will result in a well bleached pulp and particularly one with significant increase in fiber strength. Thus, it is an object of the present invention to provide such a method. It is a further object of the present invention to provide a method for recycling colored waste paper which results in a pulp which can be used to form acceptable recycled products. It is yet another object of the invention to provide a process for recycling colored waste paper which is acceptable environmentally. These and other objects of the invention will become apparent from the description of the invention.

SUMMARY OF THE INVENTION

The present invention provides a method for the enhanced bleaching of pulp containing pulp from colored waste paper. The method comprises brightening fiber from colored waste paper while increasing paper web strength. The method comprises bleaching pulp made from colored waste paper with a bleaching chemical selected from the group consisting of a hydrosulfite (such as zinc or sodium hydrosulfite), formamidine sulfinic acid (FAS), and hydrogen peroxide in the presence of an ethoxylated amine of Formula I:

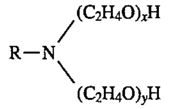

Formula I or a propoxylated amine of Formula II:

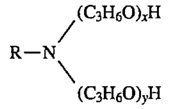

Formula II

With respect to Formulae I and II, R is a member of the group consisting of straight chain alkyls having 8 to 22 carbons, optionally having one to three substituents selected from methyl and ethyl (especially methyl). The letters x and y each stand for integers such that x and y each must have a value of at least one, are selected independently, and the sum of x+y is a number from two to 12 inclusive.

The method of the present invention comprises using one or more compounds of Formula I or II (especially Formula I) with a bleaching chemical selected from hydrosulfite, FAS and peroxide to enhance the bleaching of colored waste paper. This may be done by: (1) premixing at least one of the compounds of Formula I or II with the bleaching agent and adding that mixture to the pulp slurry; (2) adding at least one compound of Formula I or II to the pulp slurry at about the same time the bleaching agent is added; or (3) adding at least one compound of Formula I to the pulp slurry shortly before the bleaching agent is added.

The bleach solution may be stabilized with chelate such as ethylenediaminetetraacetic acid (EDTA), diethylenetriaminepentaacetic acid (DTPA), or sodium tripolyphosphate, and/or alkali such as sodium hydroxide, sodium carbonate, or calcium carbonate as needed.

DETAILED DESCRIPTION OF THE INVENTION AND DESCRIPTION OF THE PREFERRED EMBODIMENTS

The method of the present invention comprises using one or more of the compounds of Formula I or II (especially compounds of Formula I) with hydrosulfite, FAS or peroxide for bleaching colored waste paper while increasing the strength characteristics of the fiber web. A particular bleaching chemical is hydrosulfite, such as sodium hydrosulfite. If peroxide is used it may be in commercially available concentrations such as 50% or 30%.

While the general definitions for the R groups and the values of x and y have been listed above for Formulae I and II, it is preferred that R be selected from $C_{12}$–$C_{22}$ straight chain alkyls and that x and y are each independently selected to be a number from 1 to 5.

The compounds of Formulae I and II may be made by methods well known to those skilled in the art or sometimes purchased commercially. Such methods include heating (if it is a solid) the appropriate alkyl amine or natural mixtures such as tallow or coco amine until it becomes a liquid and then adding sodium hydroxide at a level of about 0.1% based on the weight of the amine. Ethylene oxide or propylene oxide is then added in an ethoxylation or propoxylation reaction to form the desired compound of Formula I or II.

In the processing of colored waste paper the paper is repulped by adding it to water to form a slurry of 3 to 40 percent dry fiber (also called 3 to 40 percent consistency) in a pulper. The fiber slurry may be subjected to a deinking process (for example, by using washing or flotation processes well known to those in the art) prior to treatment with the compounds of this invention. The resulting pulp may be pretreated with a chelate such as ethylenediaminetetraacetic acid, diethylenetriaminepentaacetic acid, sodium tripolyphosphate, to name a few, if desired.

It should be noted that both broke and waste paper may be repulped with or without the use of caustic, depending on the physical and optical properties required. These methods are known to those skilled in the art.

At one or more points in the processing of colored waste paper a bleaching step is used. Conventionally, such bleaching is done with the use of peroxide, such as from 0–5% of a 50% solution; hydrosulfite, such as from 0–3%; or FAS, such as from 0–2%. Typical values for addition levels of these bleaching agents are as follows:

(a) hydrosulfite—0.25–1.0% such as 0.5–1.0% or 0.5–1.5%

(b) FAS—0.25–1.0%

(c) hydrogen peroxide—0.5–3%

In conventional techniques, a bleaching solution is added to a pulp slurry at a pump or other point where satisfactory mixing can be achieved (with minimum air contact if hydrosulfite or FAS is used). The pulp mixture is then held for at least one hour in a tower or chest where minimum air contact is allowed (if hydrosulfite or FAS is used). The bleaching reaction takes place during this time.

The bleaching process can be repeated, but usually such bleaching is not done more than two times.

The present invention provides a method for enhancing the (particularly with sodium hydrosulfite as the bleaching agent) bleaching of colored broke or waste paper with substantially increasing the strength of the resulting fiber web.

The aqueous pulp slurry is heated to a temperature of from about 120 degrees to about 180 degrees F. (50 degrees to 82 degrees C.). The pH of the slurry is adjusted so that it is in the range of 3.5 to 11.0. This pH adjustment may be accomplished by using NaOH or NaOH or $Na_2CO_3$ as the base and $H_2SO_4$ as the acid. The addition of at least one compound of Formula I or II may be done at any time in the mill system prior to or in conjunction with the addition of the bleaching agent. For example, the addition of the additive may be accomplished by one of the following methods:

(a) An amine compound of Formula I or II is added to the bleach solution—

(1) The amine compound is dissolved in water.

(2) The pH is adjusted to 10 with NaOH or $Na_2CO_3$.

(3) Solid sodium hydrosulfite, solid FAS or a solution of $H_2O_2$ is added and dissolved.

(b) An amine compound of Formula I or II is blended with the bleaching agent—

(1) At least one amine compound is mixed with the selected bleaching agent.

(2) The blended mixture is then added to the pulp slurry which has been prepared as described above.

(c) An amine compound of Formula I or II is added at the same time the bleaching agent is added—

(1) At least one amine compound is added to the pulp slurry which has been prepared as described above.

(2) The addition of the amine compound is done at about the same time the bleaching agent is added to the pulp slurry.

The amount of amine compound added is from about 5 pounds (2.3 kilograms) (0.25 percent addition level) to about 20 pounds (9.1 kilograms) (1.0 percent addition level) per ton of dry fiber content with:

(a) 5–50 pounds (2.3–22.7 kg) of hydrosulfite;

(b) 3–15 pounds (1.4–6.8 kg) of FAS;

(c) 30–100 pounds (18.1–45.5 kg) of hydrogen peroxide (50%) solution. (Note that those skilled in the art may use different concentrations of $H_2O_2$ solution while maintaining this ratio.)

After the bleaching agent and amine compound have been added to the pulp slurry, the pulp is mixed, preferably intensely, and preferably under a nitrogen atmosphere if hydrosulfite or FAS have been used, while maintaining the temperature between 80 degrees F. (25 degrees C.) and 212 degrees F. (100 degrees C.). If good mixing has been achieved, the time needed for bleaching is usually in the range of from about one-half hour to about one and one-half hours. Longer periods of time may be used if desired or if convenient.

After the bleaching step has been completed, the pulp is cooled, for example, by dilution with mill process or whitewater. The pH is then adjusted according to the requirements of the particular paper machine or the paper products being made. For example, such pH's may be in the range of from about 3.5 to about 11 and effected by using a base such as sodium hydroxide or sodium carbonate or an acid such as sulfuric acid. The selection of pH is not a part of this invention. Those skilled in the art will also recognize that the method of this invention may also be used with pulps which are made with partial amounts of colored waste paper.

Evaluation of Effects of Bleaching on Pulp

In order to evaluate the effect of this method on pulp two evaluations may be performed.

Brightness

The first evaluation is a brightness assessment. This assessment is done by making pads using Technical Association of the Paper and Pulp Industry (TAPPI) Standard Method T218 om-91, incorporated by reference herein in its entirety. The brightness evaluation is then done in accordance with TAPPI Standard Method T525 om-86, incorporated by reference herein in its entirety. Generally method T218 om-91 describes the formation of handsheets for measuring the reflectance of pulp and method T525 om-86 describes how to measure the diffuse brightness of pulp.

The significance of the brightness data shown in Table I below is that any value at least one point above the 63.5 value for a sample bleached with hydrosulfite alone is a significant improvement. The "ISO Brightness" is a method of measuring brightness developed by the International Organization for Standardization and is well known to those in the art.

Strength

The second evaluation is an assessment of the strength of handsheets made with pulp bleached using the process of this invention. Handsheets were made using TAPPI Standard Method T205 om-88, incorporated by reference herein in its entirety. The control is a handsheet made by the same TAPPI method, except that the pulp used for the control handsheet is made from pulp bleached with hydrosulfite alone and no ethoxylated amine additive. Blanks are made using the same TAPPI method, except that the handsheets are made from pulp which has not been treated with either or both of hydrosulfite or additive. The strength of the handsheets is evaluated using TAPPI Standard Method T494 om-88, incorporated by reference herein in its entirety. This T494 method is used to evaluate the tensile breaking properties of paper and paperboard using apparatus for measuring the constant rate of elongation.

The significance of strength in Table I was determined by null-hypothesis testing at the 95% confidence level using the SigmaStat software package (Jandell Scientific Company) which showed that Example 5 was significantly higher in tensile strength then Examples 1 through 4.

EXAMPLES

The following Examples are illustrative of the invention but should not be interpreted as limitations thereon. Unless otherwise indicated, all percents are weight percents and symbols have their usual and customary meanings: ° C. is degrees Centigrade, ml is milliliter, kg is kilogram, g is gram, lb is pound, DTPA is diethylene-triaminepentaacetic acid pentasodium salt. Chemical symbols have their usual and customary meanings. The colored paper referenced in these examples was obtained from a local office products supply store in Charlotte, N.C. and was a random selection.

The strength data was obtained by first forming handsheets from the bleached pulp according to the TAPPI Standard Method T205 om-88 and measuring the strength of sheets formed according to the procedure described in TAPPI Standard Method T494 om-88.

All pulps made in the following Examples were stored at 34 degrees F. (1 degree C.) until used.

EXAMPLE 1

(Unbleached Pulp)

A stock of colored ledger waste paper pulp was made by the following method. To 5 lb. (2.27 kg) of colored broke was added 20.7 liters of water at 65° F. (25° C.) in a Laboratory Pulper (Adirondack Machine Company, Glynns Falls, New York). Repulping was carried out over a period of 15 minutes. The resulting pulp slurry (containing 10 percent solids) was used as the supply of pulp for the following Examples.

For the Examples in which bleaching was done with hydrogen peroxide, the pulp sample was dewatered to a consistency of 12 percent (12 percent solids) on a B üchner funnel fitted with a #4 Whatman filter paper.

For the Examples below, further dilution with deionized water was done as noted. For example, Examples in which bleaching was done with hydrosulfite, a sample of pulp was diluted to 4 percent consistency (4 percent solids) with deionized water.

EXAMPLE 2

(Peroxide Bleaching)

Five plastic bags were each filled with 100 grams of pulp prepared according to Example 1 and having 12 percent consistency. The bags were closed and placed in a water bath which was brought up to a temperature of 140 degrees F. (60 degrees C.). The bags of pulp were then emptied into the bowl (1 gallon or 3.8 liter capacity) of a Hobart Planetary Action Mixer. While mixing the pulp, a bleach solution was added slowly by syringe. This bleach solution was made by mixing:

(a) 20 ml of a 10 percent (weight/weight) aqueous $H_2O_2$ solution (equivalent to 2 percent $H_2O_2$ on a dry pulp basis);

(b) 20 ml of a 7.5 percent (weight/weight) aqueous NaOH solution (equivalent to 1.5 percent NaOH on a dry pulp basis); and (c) 20 ml of a 0.2 percent (weight/weight) aqueous solution of DTPA (equivalent to 0.04 percent DTPA on a dry pulp basis).

After mixing the pulp with the bleach solution, the pulp was divided into five equal parts and returned to the plastic bags. The bags were held at the 60 degree C. temperature for 90 minutes in a water bath. Each bag of pulp was removed from the bath and placed in its own beaker. Then, 10 ml of sulfurous acid (6 percent $SO_2$ in deionized water) was added with mixing to the pulp to neutralize the residual peroxide. The bleached pulp was then diluted to 4 percent consistency with deionized water. A representative sample was removed and a brightness pad was formed according to the TAPPI Standard Method T218 om-91 referenced above. The brightness data is found in Table I. This data is the average of measurements taken on two pads.

EXAMPLE 3

(Sodium Hydrosulfite Bleaching)

Samples of pulp (375 gram samples of 4 percent consistency) prepared and stored according to the method of Example 1 were placed in two 500 ml wide mouth polyethylene bottles (375 g/bottle). The bottles were heated to 150 degrees F. (65.5 degrees C.) using a water bath. The bottles were then transferred to a deaeration station equipped with a vacuum gauge and a line (equipped with a Firestone valve) attached to a vacuum apparatus (water aspirator) and a nitrogen supply. The pulp was deaerated by alternatively subjecting the bottle to a vacuum created by a water aspirator and then flushing the bottle with nitrogen. This was done three times. Each bottle was then moved to a mixing station consisting of a rubber stopper permanently attached to a ring stand through which was mounted an overhead variable speed mixer, a pH probe, and a nitrogen line. The rubber stopper also contained an opening through which bleach was added via syringe. Mixing was started and the pH was adjusted to 7.0 using 0.1N NaOH or 0.1 N $H_2SO_4$ as required. Sodium hydrosulfite (10 ml of a 1.5 percent solution) (weight/weight, sodium hydrosulfite/deionized water) was then added by syringe. Stirring was continued for 3 minutes, after which each bottle was recapped and returned to the water bath (150 degrees F., 65.5 degrees C.) for one hour. The pulp was then removed from the water bath and a representative sample (3 g dry weight) was removed and used to from a brightness pad according to TAPPI Standard Method T218 om-91 referenced above. The brightness data is found in Table I.

EXAMPLE 4

(Peroxide/Hydrosulfite Two Stage Bleaching)

An entire sample of pulp prepared according to the method of Example 2 (except for making the pad) was diluted to 4 percent consistency. Two bottles were then each filled with 375 grams of slurry and treated using the method of Example 3. A brightness pad was made according to TAPPI Standard Method T218 om-91. The brightness data is listed in Table I.

EXAMPLE 5

(Hydrosulfite and Ethoxylated Amine Compound, Preblended)

Two samples (375 grams each) of the 4 percent pulp slurry prepared according to the method of Example 1 were placed into each of two bottles. The pulp was then treated according to the method of Example 3, except that the 10 ml of 1.5 percent weight/weight hydrosulfite bleach solution was premixed with 10 ml of 0.75 percent by weight of a tallow amine ethoxylated with 5 moles of ethylene oxide before addition to the pulp. A brightness pad was made according to TAPPI Standard Method T218 om-91. The brightness data is listed in Table I.

EXAMPLE 6

(Hydrosulfite and Ethoxylated Amine, Ethoxylated Amine Added First)

The method described in Example 5 was repeated except that 10 ml of a 0.75 percent by weight solution of a tallow amine ethoxylated with 5 moles of ethylene oxide was added just prior to the addition of the 10 ml of 1.5 percent weight/weight hydrosulfite solution.

EXAMPLE 7

The method of Example 6 was repeated except that cocoamine ethoxylated with 5 moles of ethylene oxide replaced the amine used in Example 6.

EXAMPLE 8

The method of Example 6 was repeated except that a tallow amine ethoxylated with 20 moles of ethylene oxide replaced the amine used in Example 6.

TABLE I

| Example Number | DESCRIPTION OF TREATMENT | ISO Brightness (percent) | Breaking Length (meters) |
|---|---|---|---|
| 1 | Unbleached pulp | 36.0 | 4252 |
| 2 | Peroxide bleached pulp | 44.0 | 4388 |
| 3 | Sodium hydrosulfite bleached pulp | 63.5 | 4672 |
| 4 | Peroxide followed by hydrosulfite bleached pulp | 72.0 | 4375 |
| 5 | Hydrosulfite preblended with amine | 68.2 | 5537 |
| 6 | Hydrosulfite and amine added at the same time | 68.2 | |
| 7 | Hydrosulfite and amine added at the same time | 65.2 | |
| 8 | Hydrosulfite and amine added at the same time | 64.8 | |

What is claimed is:

1. A method for decolorizing and brightening fiber from color dyed waste paper while increasing the strength of the fiber web wherein said process comprises bleaching pulp made from color dyed waste paper with a bleaching chemical selected from the group consisting of zinc hydrosulfite, sodium hydrosulfite, formamidine sulfinic acid, and hydrogen peroxide in the presence of an alkoxylated amine selected from the group consisting of an ethoxylated amine of Formula I:

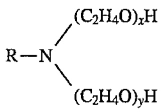

Formula I and a propoxylated amine of Formula II:

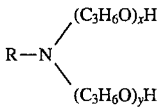

Formula II wherein:

R is a member of the group consisting of straight chain alkyls having 8 to 22 carbons, optionally having one to three substituents selected from methyl and ethyl;

x and y each stand for integers, x and y each have a value of at least one, x and y are selected independently and the sum of x y is a number from two to 12 inclusive; and wherein the alkoxylated amine is added at a level of at least 0.25% per ton of dry fiber content.

2. The method of claim 1 wherein R is a straight chain alkyl group selected from the group consisting of $C_{12}$–$C_{22}$.

3. The method of claim 1 wherein x and y are each independently selected from the numbers 1 to 5.

4. The method of claim 1 wherein R has one to three substituents selected from the group consisting of methyl and ethyl.

5. The method of claim 4 wherein the substituent is methyl.

6. The method of claim 1 wherein the bleach solution contains at least one member from the group consisting of (a) a chelate selected from the group consisting of ethylenediaminetetraacetic acid, diethylenetriaminepentaacetic acid, and sodium tripolyphosphate; and (b) a caustic selected from the group consisting of sodium hydroxide, sodium carbonate and calcium carbonate.

7. The method of claim 1 wherein said compound of Formula I is a tallow amine ethoxylated with 5 moles of ethylene oxide.

8. The method of claim 1 wherein said compound of Formula I is a coco amine ethoxylated with 5 moles of ethylene oxide.

9. The method of claim 1 wherein said compound of Formula I is a tallow amine ethoxylated with 20 moles of ethylene oxide.

10. The method of claim 1 wherein said method comprises a mixing method selected from the group consisting of:

(1) premixing at least one of the compounds of Formula I with said bleaching agent and adding that mixture to the pulp slurry;

(2) adding at least one compound of Formula I to the pulp slurry at about the same time the bleach is added; and (3) adding at least one compound of Formula I to the pulp slurry shortly before the bleach is added.

11. The method of claim 1 wherein said bleaching chemical contains a member selected from formamidine sulfinic acid and sodium hydrosulfite.

12. The method of claim 11 wherein said bleaching chemical contains sodium hydrosulfite.

* * * * *